No. 732,328. Patented June 30, 1903.

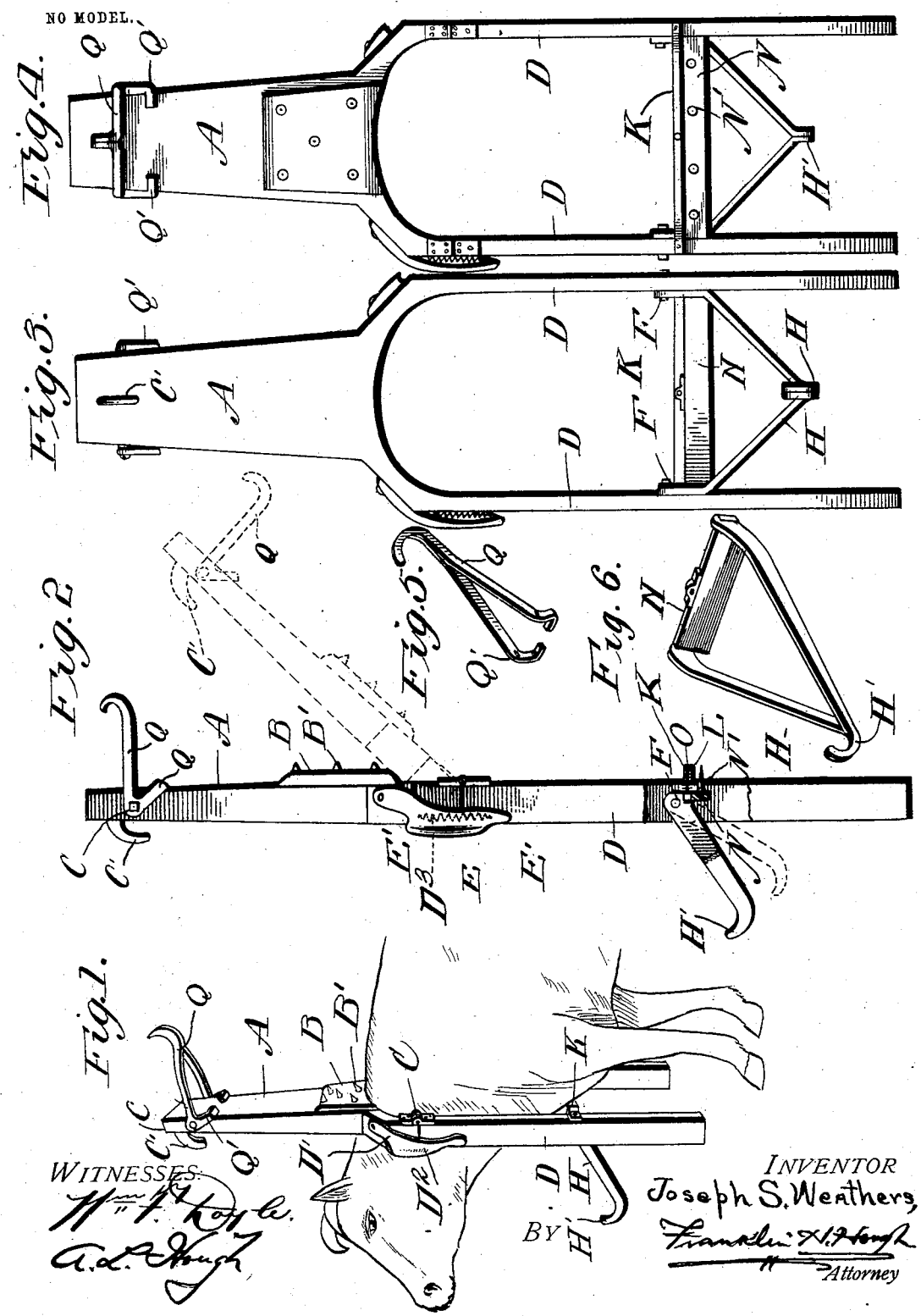

UNITED STATES PATENT OFFICE.

JOSEPH S. WEATHERS, OF WINDSOR, MISSOURI.

ANIMAL-POKE.

SPECIFICATION forming part of Letters Patent No. 732,328, dated June 30, 1903.

Application filed March 24, 1903. Serial No. 149,274. (No model.)

*To all whom it may concern:*

Be it known that I, JOSEPH S. WEATHERS, a citizen of the United States, residing at Windsor, in the county of Henry and State of Missouri, have invented certain new and useful Improvements in Animal-Pokes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in pokes for animals; and it consists in the provision of a device of this nature adapted to be held about the neck of an animal and means being provided whereby as the animal attempts to go through or between the strands of a fence or comes forcibly in contact with a fence its speed will be checked by spurs which are forced into the animal and in the provision of a spring-actuated portion of the poke projecting above the back of the animal and provided for the purpose of spurring the back of the neck in case the upper portion of the poke comes into contact with an obstruction.

The invention consists, further, in various details of construction and in combinations and arrangements of parts, which will be hereinafter fully described and then specifically defined in the appended claims.

My invention is illustrated in the drawings, in which—

Figure 1 is a perspective view showing my poke as attached to an animal. Fig. 2 is a side elevation of the poke, a portion of which is shown in dotted lines. Fig. 3 is a front elevation of the poke. Fig. 4 is a rear elevation, and Figs. 5 and 6 are detail views.

Reference now being had to the details of the drawings by letter, A designates the yoke portion of the poke, which is rounded on its lower end and adapted to fit comfortably over the neck of an animal, and B designates a plate which is fastened to said yoke, the lower edge of said plate conforming to the concaved shape of the lower portion of the yoke, and spurs B' project laterally from said plate and are adapted to prick into the back of the animal as said yoke is turned rearward. Hinged to the upper end of said yoke is a hooked member Q, having its ends bent at an angle, as at Q', and adapted to engage the rear face of the portion A, as shown clearly in Figs. 1 and 2 of the drawings. Projecting from the forward edge of the yoke A is a hook C', which is downwardly disposed, as shown, and provided for the purpose of catching upon the strands of a fence or other obstruction in case an animal equipped with the poke comes in contact with the fence, thus serving to arrest its progress.

D designates bars which are hinged at C to the arms of said yoke, and D' designates plates which are fastened at their upper ends to the portion A, each having an arm $D^2$, which projects down over the hinged ends of the parts and is provided as a housing to protect the spring $D^3$, one end of which is fastened to an arm of the yoke A and the other end of which is secured to the bar D, said springs being provided for the purpose of allowing the yoke A to yield and turn rearward. Mounted between said bars is a cross-piece K, and H designates a hooked member pivotally mounted at F upon said bars, and N is a block secured to said hooked member H and has spurs N' projecting from the rear face of said block. A spring L is interposed between the cross-piece K and the block N and is mounted upon the pin O, said spring being provided for the purpose of throwing the hooked member H back to its normal position in case the latter is thrown rearward by coming into contact with an obstruction.

From the foregoing it will be observed that by the provision of a poke embodying the construction of my invention an animal equipped with the same will be kept from crawling under fences, through the same, or coming in contact with other obstructions, the forward progress of the animal being prevented by the pain which is inflicted upon the animal by the spurs coming in contact with the hide of the animal.

While I have shown and described a particular construction of apparatus illustrating my invention, it will be understood that I may make changes in the detailed construction of the same without departing from the spirit of my invention.

Having thus fully described my invention, what I claim as new, and desire to secure by Letters Patent, is—

1. A poke for animals, comprising a yoke having its lower end concaved and adapted to conform to the contour of the neck of an animal, a spur-carrying plate secured to said yoke and having its lower end concaved, hinged bars mounted on the arms of said yoke, and a spring-actuated hooked bar projecting forward from the poke, as set forth.

2. A poke for animals, comprising a yoke having its lower end concaved to conform to the contour of the neck of an animal, a spur-carrying plate secured to said yoke, a hooked member pivoted to the top of the yoke and having angled ends adapted to engage over the corners of the yoke, bars hinged to the arms of the yoke, springs secured to the adjacent hinged ends of said bars and yoke and adapted to hold said bars and yoke in alinement, and a hooked bar projecting from the forward face of the poke, as set forth.

3. A poke for animals, comprising a yoke, a spur-plate thereon, a hooked member pivotally mounted on the upper end thereof, bars hinged to the arms of the yoke, springs for normally holding said bars in alinement with the ends of the yoke, a cross-piece connected to said arms, a hooked member pivoted to said bars, a spur-plate carried by said member, a pin fastened to said piece connecting said bars and passing through an aperture in the cross-piece, and a spring bearing against said block and adapted to normally hold said hooked member at its farthest forward throw, as set forth.

4. A poke for animals, comprising a yoke, a spur-plate thereon, hooked members at the top of the yoke, bars hinged to the arms of the yoke, plates secured to the arms of the yoke and extending down over said hinged portion, springs secured at their upper ends to said yoke and at their lower ends to said bars, and a spring-pressed hooked member pivotally connected to said bars, as set forth.

In testimony whereof I hereunto affix my signature in presence of two witnesses.

JOSEPH S. WEATHERS.

Witnesses:
B. F. LEONARD,
ROSS E. FEASTER.